(12) United States Patent
Tervonen et al.

(10) Patent No.: US 6,421,149 B2
(45) Date of Patent: Jul. 16, 2002

(54) PROTECTION IN AN OPTICAL TELECOMMUNICATIONS SYSTEM

(75) Inventors: Ari Tervonen, Vantaa; Markku Oksanen, Helsinki, both of (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/829,334

(22) Filed: Apr. 7, 2001

Related U.S. Application Data

(63) Continuation of application No. PCT/FI99/00931, filed on Nov. 8, 1999.

(30) Foreign Application Priority Data

Nov. 10, 1998 (FI) .................................................. 982442

(51) Int. Cl.$^7$ ............................................. H04B 10/08
(52) U.S. Cl. ..................................... 359/110; 359/173
(58) Field of Search ................................. 359/110, 173, 359/177

(56) References Cited

U.S. PATENT DOCUMENTS

| | | | |
|---|---|---|---|
| 5,442,623 A | | 8/1995 | Wu ............................. 359/110 |
| 5,793,481 A | * | 8/1998 | Leali .......................... 356/73.1 |
| 5,963,312 A | * | 10/1999 | Roberts ...................... 356/73.1 |
| 6,115,154 A | * | 9/2000 | Antoniades et al. ........ 359/110 |

FOREIGN PATENT DOCUMENTS

| | | |
|---|---|---|
| EP | 0907266 A2 | 4/1999 |
| WO | WO 98/34363 | 8/1998 |

OTHER PUBLICATIONS

E.L. Goldstein and L. Eskildsen; "Scaling Limitations in Transparent Optical Networks Due to Low–Level Crosstalk", IEEE Photonics Technology Letters, vol. 7, No. 1, Jan. 1995, pp. 93–94.
International Search Report for PCT/FI99/00931.

* cited by examiner

*Primary Examiner*—Kinfe-Michael Negash
(74) *Attorney, Agent, or Firm*—Altera Law Group, LLC

(57) ABSTRACT

The invention relates to protection of an optical transmission connection. From the transmitting end of the connection, the same optical signal is transmitted along a first path and a second path to the receiving end, where the power level of the signal received from each path is monitored, and one of the paths is selected as the working path and the signal arriving from the said path is connected to the receiver, whereby the other path remains as a redundancy path. For the transmission connection to preserve an optimum performance also when the power level difference between the paths is varying, that path is at each time selected as the working path, where the received signal is considered at the moment in question to have the higher power level. The selection is always carried out when the power level difference between the signals reaches a predetermined threshold value, irrespective of the power level of the signal received at that time from the working path.

8 Claims, 2 Drawing Sheets

PROTECTION IN AN OPTICAL TELECOMMUNICATIONS SYSTEM

This application is a continuation of international application Ser. No. PCT/FI99/00931, filed Nov. 8, 1999.

FIELD OF THE INVENTION

The invention is generally related to optical transmission systems, and especially to the protection used therein, the purpose of which is to make sure that the system can go on working even in failure or error situations.

BACKGROUND OF THE INVENTION

In optical transmission systems, an optical signal is modulated with an outbound data stream, and the modulated optical signal is applied to optical fiber. In order to increase the capacity of the system, the bandwidth of the data stream can be increased or more wavelengths can be introduced, each of which is modulated with a discrete data stream. The latter method is termed wavelength division multiplexing.

Wavelength division multiplexing (WDM) is an efficient way of multiplying the capacity of optical fiber. In wavelength division multiplexing, several independent transmitter-receiver pairs use the same fiber. FIGS. 1a and 1b illustrate the principle of wavelength division multiplexing, using as an example a system having four parallel transmitter-receiver pairs. Each of the four information sources (not shown in the figure) modulates one of four optical transmitters, each of which generates light at a different wavelength ($\lambda_1 \ldots \lambda_4$). As will be seen from FIG. 1a, the modulation bandwidth of each source is smaller than the distance between the wavelengths, and thus the spectra of the modulated signals do not overlap. The signals generated by the transmitters are combined onto the same optical fiber OF in a WDM multiplexer WDM1, which is a fully optical (and often passive) component. At the opposite end of the fiber, a WDM demultiplexer WDM2, which is also a fully optical (and often passive) component, separates the different spectral components of the combined signal from one another. Each of these signals is detected at a discrete receiver. Hence, a narrow wavelength window is assigned for the use of each signal in a given wavelength range. A typical practical example might be a system where the signals are in the 1550 nm wavelength range for example in such a way that the first signal is at wavelength 1544 nm, the second signal at wavelength 1548 nm, the third signal at wavelength 1552 nm and the fourth signal at wavelength 1556 nm. Nowadays a multiple of 100 GHz (approx. 0.8 nm) is becoming the de facto standard for the distance between wavelengths.

Current optical telecommunications systems based on wavelength multiplexing have mainly been point-to-point transmission systems, which are used for high-capacity and long distance links (trunk connections). However, the optical transmission technique is being developed constantly to implement the lower layers of broadband network architectures as entirely optical systems, which can be used for relaying high-capacity information flows entirely optically (that is, with the aid of optical cross-connection and routing).

One of the most important features of the optical network or transmission system is its reliability. In order to improve the reliability, optical telecommunications systems use protection methods, which are used to make standby resources available in failure situations. Optical point-to-point connections use two different basic solutions to implement protection: a so-called 1+1 protection, which is illustrated in FIG. 2a, and a so-called 1:1 protection, which is illustrated in FIG. 2b. In the former method, the traffic is sent onto two separate fibers (cables), both of which lead from a source to a destination (usually along different routes). At the receiving end, one of the fibers is chosen for use. If the fiber in use breaks, the other fiber is simply put into use at the receiving end to replace it. In the latter protection method there are also two fibers (OF1 and OF2) between the source and the destination, but the traffic is sent only onto one fiber at a time. If this fiber in use breaks, the other fiber is put into use both at the transmitting end and at the receiving end. FIGS. 2a and 2b show the connections as unidirectional, but the connection may of course be bi-directional. FIG. 2c illustrates 1+1 protection of a bidirectional connection. The protection methods described above may also be utilized in optical networks.

When using 1:1 protection, the system usually needs communication between the transmission end and the receiving end to co-ordinate the switching at the different ends of the connection. In the case of a unidirectional connection, this need is obvious, since the transmission end must get information about any breaking of the fiber. In the case of a bidirectional connection, this need is due to the fact that the connection may break in one direction only, because signals of opposite transmission directions do not usually use the same components. Thus, e.g. an optical amplifier on the path of one transmission direction can fail. However, the communication required between opposite ends of the connection makes the 1:1 implementation significantly more complex than the 1+1 implementation.

The present invention is in fact concerned with implementation of the described 1+1 protection in an optical transmission system, which may be a point-to-point connection of the kind described above or an optical network, the topology of which may vary in known ways. The signals to be used in the system are typically WDM signals, but systems of one wavelength are also possible, since the solution according to the invention does not depend on what type of system signal is in question, since the protection is nevertheless channel-specific (wavelength-specific) in most cases. Thus, also in the case of a WDM signal the protection is usually implemented in a wavelength-specific manner for one or more wavelength channel signals separated from the WDM signal.

As was described above, two nodes of the optical network are usually connected to one another along two different paths, along a so-called working path WP and along a so-called redundancy path RP (FIGS. 2a . . . 2c). When 1+1 protection is used, the same traffic travels between the nodes along both paths, but at the receiving end the decision is made which path will be listened to (that is, the path which will have its traveled signal connected to the receiver). This decision-making usually takes place so that in a normal situation, when there are no faults in the network, the traffic is received from the fiber chosen to be the working path at each time. When the signal received through the working path breaks due to some trouble occurring in the network or its level falls below the permissible minimum, the redundancy path is selected at least temporarily to be the working path, and the signal received from it is connected to the receiver.

However, such a decision-making-procedure is not always the best possible, when both paths are functioning, but the signal strengths received through them are different. This is due to the fact that if the signal arriving along the redundancy path is sufficiently stronger than the signal arriving along the working path, it may cause significant interference, even if it is not connected to the receiver.

SUMMARY OF THE INVENTION

It is the objective of the invention to eliminate the drawback described above and to bring about a protection method allowing an optimum performance of the connection even when the power levels of signals received through the working and redundancy paths are essentially different.

This objective is attained through the solution defined in the independent claims.

The idea of the invention is at each time to select as the working path the path where the arriving signal has the higher power level. The power level difference, which the signals must have, to be considered to be of different magnitude, may vary. What is essential, however, is that the current power level of the signal received from the working path will not affect the selection (otherwise than through the said power level). In other words, the power level of the said signal may be within the permissible range, but the exchange is made nevertheless.

Owing to the invention, the performance of a protected optical link is made to remain optimum with all the mutual power level combinations that signals arriving from different paths may have.

BRIEF DESCRIPTION OF THE DRAWINGS

In the following, the invention and its preferred embodiments will be described in greater detail with reference to FIG. 3 in the examples of the appended drawings, wherein.

DETAILED DESCRIPTION OF THE INVENTION

As was described above, the invention concerns 1+1 protection, wherein the signal is transmitted both along a working path and along a redundancy path. If hereby some trouble or error situation occurs on the working path, in consequence of which the signal traveling along the said path does not break, but its power level falls, however, remaining e.g. within the permissible power range, this may lead to the undesirable situation described hereinafter.

Figure 1A:
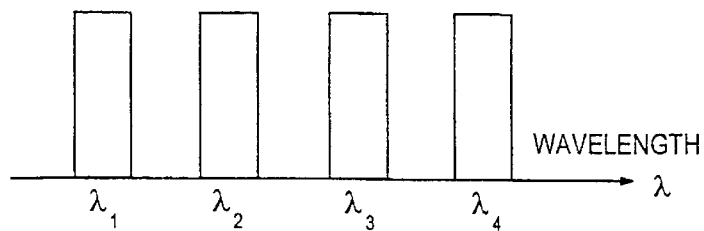
FIGS. 1a and 1b illustrate an optical transmission system using wavelength multiplexing.
Figure 1B:
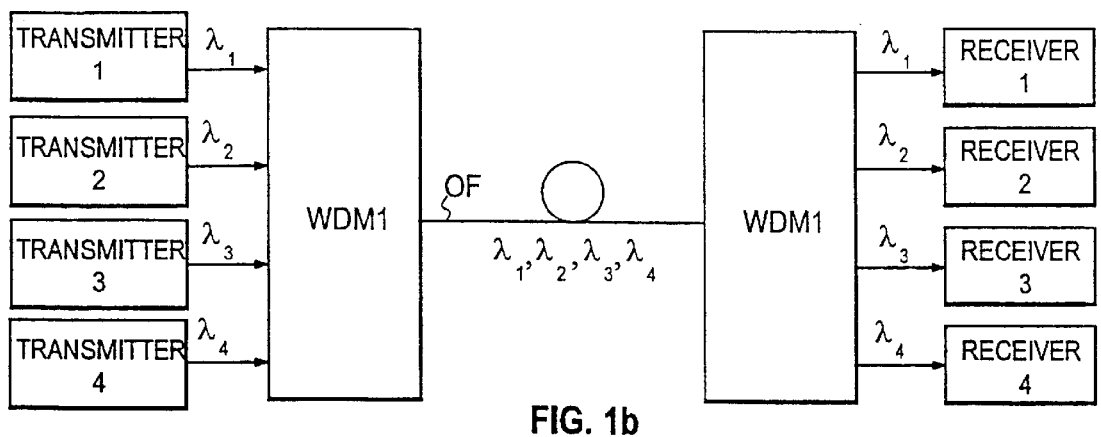
Figure 2A:
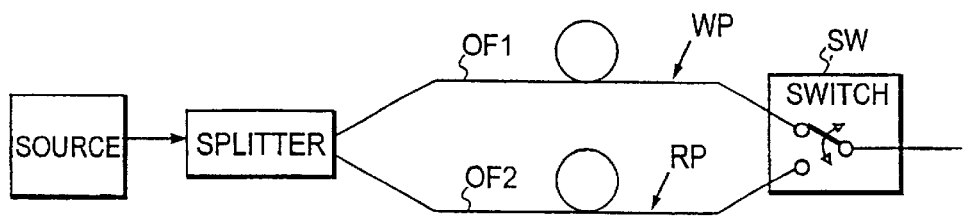
FIG. 2a illustrates the known 1+1 protection in a unidirectional optical link.
Figure 2B:
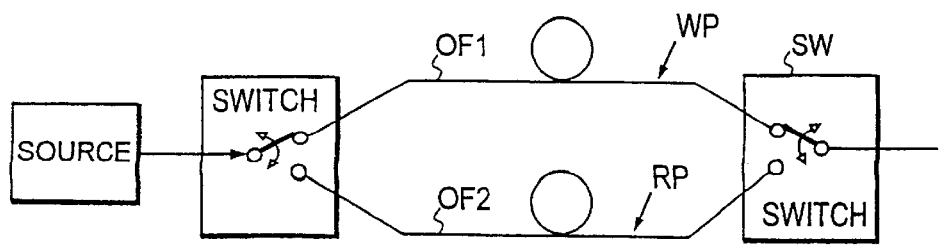
FIG. 2b illustrates the known 1:1 protection in a unidirectional optical link.
Figure 2C:
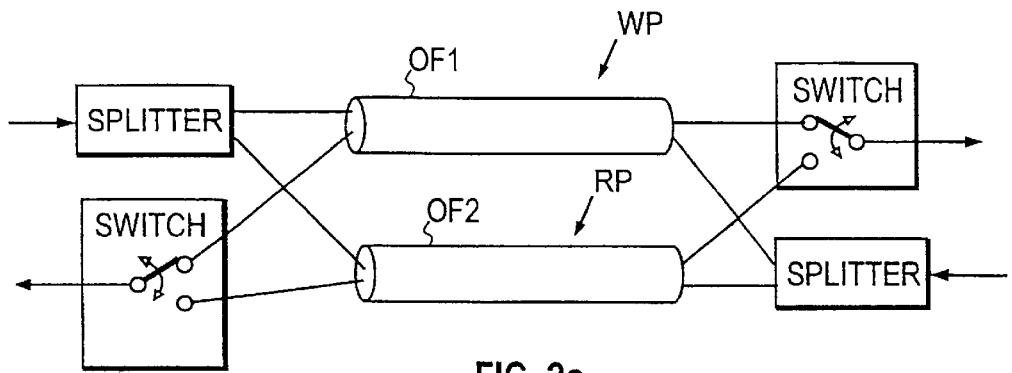
FIG. 2c illustrates the known 1+1 protection in a bidirectional optical link.

In practice, in that switch (switch SW in FIGS. 2a . . . 2c), which is used for selecting the signal to the receiver, some leakage will always occur from one channel to another. In other words, from that path also (the redundancy path), which is not utilized in the reception, a small part of the signal power will leak to the receiver. The problem is that since the paths are of different lengths, their delays are different, whereby the leaking signal is an interference. In such a case, since the signals are at the same wavelength and originate from the same source, but they have traveled along different paths to the receiver, so-called coherent leakage may occur at the receiver. In coherent leakage, the mixing of the desired signal and the leaking signal will cause fluctuation in the signal, the effect of which is emphasized. For the interference not to grow too big, in such a case leakage typically of the order of −30 dB is permitted, which can be achieved with several optical switch types.

It should be noted, however, that the signals which have traveled along different paths have experienced a different attenuation, because they have traveled through fiber links of different lengths and through different optical components, e.g. through different optical amplifiers.

Nowadays most single-step optical switches do in fact provide isolation of class 30 dB. This being the case, the power level of the signal arriving along the working path need not drop very much, when coherent leakage exceeds its permissible maximum. E.g. if the level of a signal coming along the redundancy path is of the order of 10 dB above the signal coming along the working path, and the switch isolation is of the order of 30 dB, then the leakage is already of the order of −20 dB, that is, clearly above the permissible. Such coherent leakage is described e.g. in an article by E. L. Goldstein and L. Eskildsen: Scaling Limitations in Transparent Optical Networks Due to Low-Level Crosstalk, IEEE Photonics Technology Letters, vol. 7, No. 1, January 1995. The article shows that the phenomenon becomes a problem even at the leakage levels described above.

In order to avoid an interference situation of the kind described above, the present invention proceeds in such a way that the signal is connected to the receiver along that path at each time from which a higher power level is received at the time in question. Thus, the working path is determined by the signal having the higher power level at each time. How great the difference between signal levels may become before the levels are considered to be of different magnitude is a condition that may vary. This is due on the one hand on the fact that a frequent exchange of path from one to the other and back is not desirable, and on the other hand on the fact that the precision of the power level measurement may vary.

Figure 3:
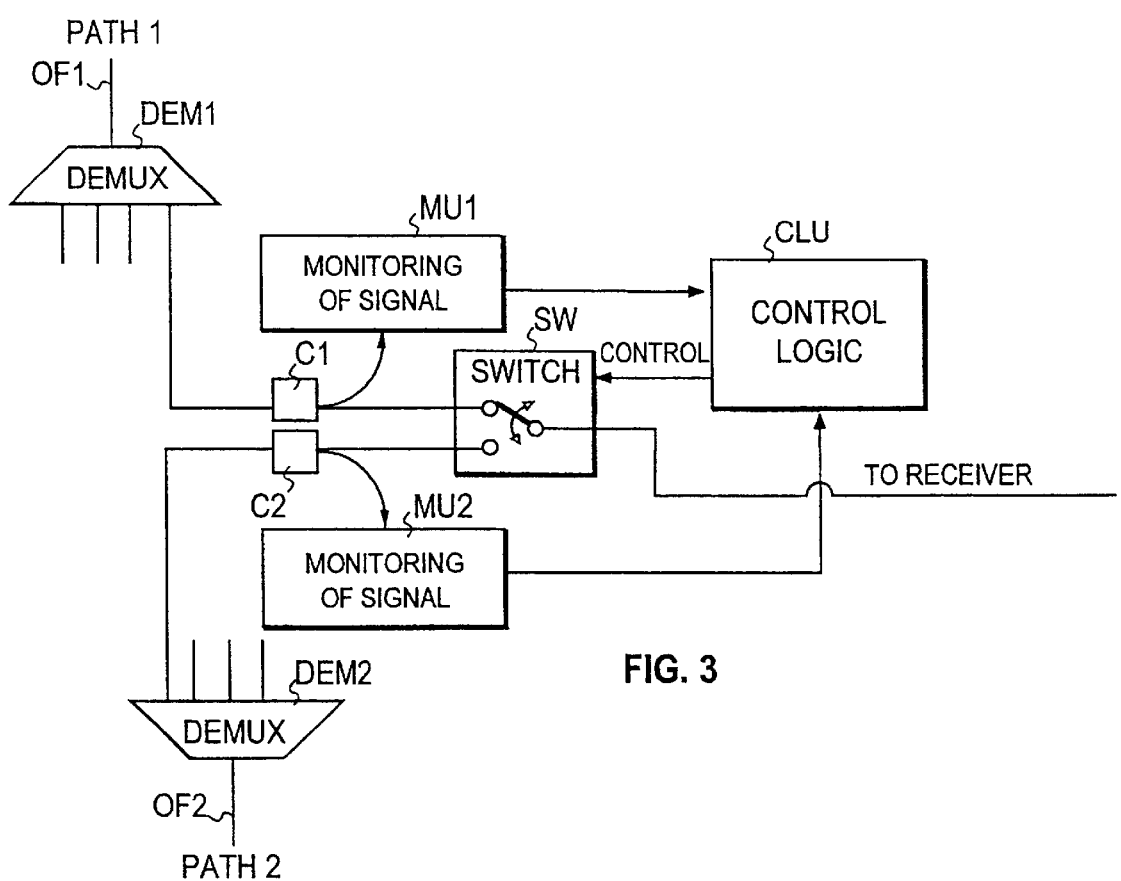
FIG. 3 illustrates the protection principle in accordance with the invention.

FIG. 3 illustrates the protection principle in accordance with the invention as regards one wavelength channel included in a WDM signal. As regards the other wavelengths of the WDM signal, the implementation is similar (if the solution according to the invention is used on all wavelength channels). The wavelength channel signal separated from the WDM signal arriving from path 1 (which is shown as the working path in the figure) in a first optical demultiplexer DEM1 is connected to a first optical tap C1, wherein a certain part (in practice, e.g. a few percent) of the optical power received at the concerned wavelength is branched off to a first monitoring unit MU1, wherein the power of the signal received along path 1 is measured in a manner known as such. The monitoring unit includes a detector known as such, which converts the optical signal into an electric signal indicating the magnitude of the received power. Correspondingly, the wavelength channel signal separated from the WDM signal arriving from path 2 in another optical demultiplexer DEM2 is connected to another optical tap C2, wherein a part of the signal power received from path 2 is branched off to another monitoring unit MU2, wherein a similar measurement is carried out as in the first monitoring unit.

From the monitoring units the power information is supplied to a common logic unit CLU, which compares the power levels with each other and controls the position of switch SW based on the comparison. Thus, the control logic unit may include e.g. a conventional comparator circuit, which decides which signal has the higher power level. A threshold for decision-making is set according to the tolerances of the equipment, that is, at a value depending on the switch isolation and on the receiver's resistance to leakage. E.g. if the switch provides an isolation of 28 dB and the receiver tolerates leakage of no more than −25 dB, the threshold may be no more than 3 dB. However, in practice the threshold size is also affected by the precision of measurement: e.g. for reasons of cost, ideal monitoring is not one that measures powers as precisely as possible. However, the threshold (the difference between power levels) must be of such a magnitude that it can be measured. In practice, the threshold size could be e.g. no less than 1 dB, which is such a power level difference in practice which can be reliably measured.

So if the signals have a power level difference which is at least equal to the threshold, the position of the switch is changed, if at that moment the signal is not taken from the path where the received signal has a higher power level.

In general, the power levels of signals do not vary essentially during the operation, but it may be necessary to turn the switch on account of gradual change of power levels, for example. Thus, the connection is in a normal protected state even after this, since neither signal has broken off entirely. This means that the redundancy path is still in use.

In the initial situation, the selection between working path and redundancy path can be made on a signal level basis. The method may be restoring in such a way that the original path is restored as the working path after the power level of the signal received from it has increased and become e.g. equal to the power level of the signal which is at that moment received from the working path. It is also possible to use two different threshold values, so that a move is made to the second path from the path chosen originally as the working path, when the signal level of the second path exceeds by the first threshold value the signal level received from the original working path, and from the second path a move is made back to the original working path, when the signal level received from the original working path has changed and become higher by the second threshold value than the signal level received from the second path, or when the signal level received from the original working path has again reached the signal level received from the second path.

Although the invention has been described above with reference to the examples shown in the enclosed drawings, it is obvious, that the invention is not limited to this, but it may be varied within the scope of the inventive idea presented in the appended claims. As was noted above, the solution according to the invention can be used in many different environments and in connection with many different network topologies.

What is claimed is:

1. A method of protecting an optical transmission connection, the method comprising:

transmitting a same optical signal from a transmission end along a first path and a second path to a receiving end, monitoring a power level of the signal received from each path at the receiving end, selecting one of the paths at the receiving end as a working path and connecting the signal arriving from the said path to a receiver, wherein the other path remains as a redundancy path, and selecting as the working path, a path having an arriving signal that is regarded as having a higher power level, the selection being made when the power level difference between the signals on the first and the second path reaches a predetermined threshold value, irrespective of the power level of the signal received at that moment from the working path.

2. The method as defined in claim 1, wherein when the first path is the working path, a first threshold value is used, by which the power level of the signal received from the second path must exceed the power level of the signal received from the first path before the said second path is chosen as the working path, and when the second path is the working path, a second threshold value is used, by which the power level of the signal received from the first path must exceed the power level of the signal received from the second path before the said first path is chosen as the working path.

3. The method as defined in claim 2, wherein the first threshold value and the second threshold value are essentially equal, only one threshold value is used.

4. The method as defined in claim 2, wherein the first threshold value and the second threshold value are different, two threshold values are used.

5. The method as defined in claim 4, in that one threshold value is essentially equal to zero.

6. An arrangement for protecting an optical transmission connection, the arrangement comprising:

transmission means for transmitting the same optical signal along a first path and along a second path to a receiving end, monitoring means located at the receiving end for monitoring a power level of the signal received from each path, at the receiving end, selecting means, responsive to the monitoring means, for selecting one of the paths as a working path from which received signal is connected to a receiver, and the selecting means selecting a path having the received signal that is considered to have a higher power level, wherein the selection is always carried out when a power level difference between the signals on the first path and the second path reaches a predetermined threshold value, irrespective of the power level of the signal received from the working path at that time.

7. The arrangement as defined in claim 6, wherein the selecting means use one threshold value only.

8. The arrangement as defined in claim 6, wherein that the selecting means use different threshold values, depending on which one of the paths is at that moment selected as the working path.

* * * * *